United States Patent
Kimura

(10) Patent No.: US 8,698,473 B2
(45) Date of Patent: Apr. 15, 2014

(54) SWITCHING REGULATOR

(75) Inventor: Takeshi Kimura, Yokohama (JP)

(73) Assignee: Spansion LLC, Sunnyvale, CA (US)

( * ) Notice: Subject to any disclaimer, the term of this patent is extended or adjusted under 35 U.S.C. 154(b) by 283 days.

(21) Appl. No.: 13/173,926

(22) Filed: Jun. 30, 2011

(65) Prior Publication Data

US 2012/0056610 A1 Mar. 8, 2012

(30) Foreign Application Priority Data

Sep. 3, 2010 (JP) ................................ 2010-197530

(51) Int. Cl.
 *H02M 3/156* (2006.01)
(52) U.S. Cl.
 USPC .......................................................... 323/285
(58) Field of Classification Search
 USPC .................. 323/286, 282–285, 351
 See application file for complete search history.

(56) References Cited

U.S. PATENT DOCUMENTS

| | | | |
|---|---|---|---|
| 6,724,174 B1 * | 4/2004 | Esteves et al. ................ | 323/224 |
| 6,917,190 B2 * | 7/2005 | Matsuo et al. ................ | 323/287 |
| 2007/0176588 A1 | 8/2007 | Nishida | |

FOREIGN PATENT DOCUMENTS

| | | |
|---|---|---|
| JP | 2006-25547 A | 1/2006 |
| JP | 2007-202273 A | 8/2007 |

OTHER PUBLICATIONS

Chihiro Kawabata et al., "A Study of The Slope Compensation Scheme of a Current-Mode DC-DC Converter to Obtain The Input and Output Independent Frequency Characteristics", Proceedings of the IEICE General Conference 2008, Electronics (2), 121, Mar. 5, 2008, pp. 1-5.

* cited by examiner

*Primary Examiner* — Harry Behm
(74) *Attorney, Agent, or Firm* — Sterne, Kessler, Goldstein & Fox P.L.L.C.

(57) ABSTRACT

A switching regulator: first switching element and second switching element; a logic unit which outputs to the load the output voltage converted from the input voltage to the constant voltage, by causing the first switching element and the second switching element to perform a switching operation; an error amplifier which outputs first signal indicating an error between the output voltage and the first reference voltage; first comparator which inputs the first signal and second signal indicating an output voltage that is proportional to load current flowing in the load, and outputs to the logic unit control signal causing the logic unit to perform the switching operation based on the first signal and the second signal; and a correction unit which is connected to an input side of the error amplifier, and corrects an input voltage of the error amplifier to reduce the input voltage to a certain value or lower.

12 Claims, 15 Drawing Sheets

SWITCHING REGULATOR 100

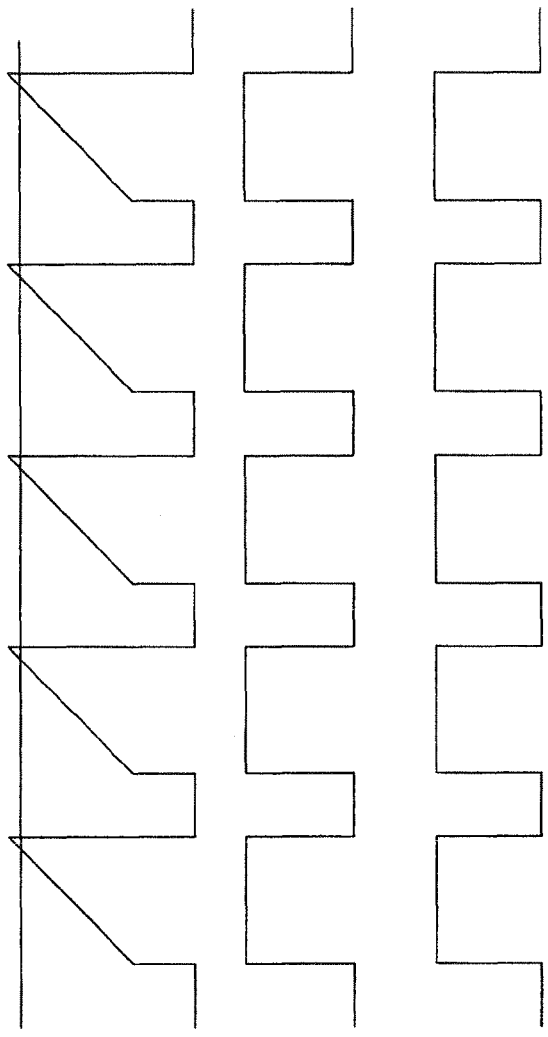
FIG.13A ERROR AMPLIFIER OUTPUT / I/V CONVERSION OUTPUT
FIG.13B PWM_COMP OUTPUT
FIG.13C LX

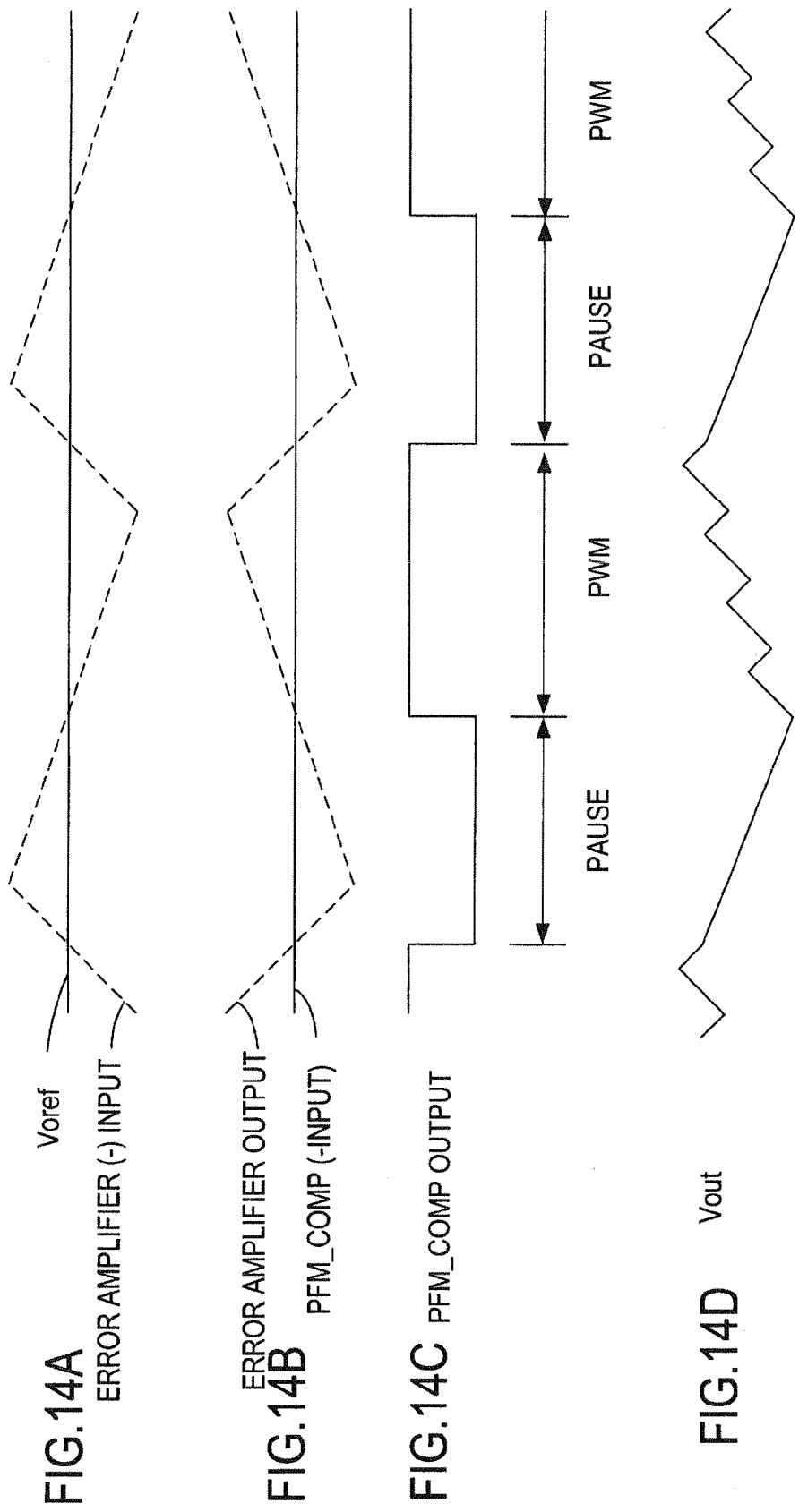

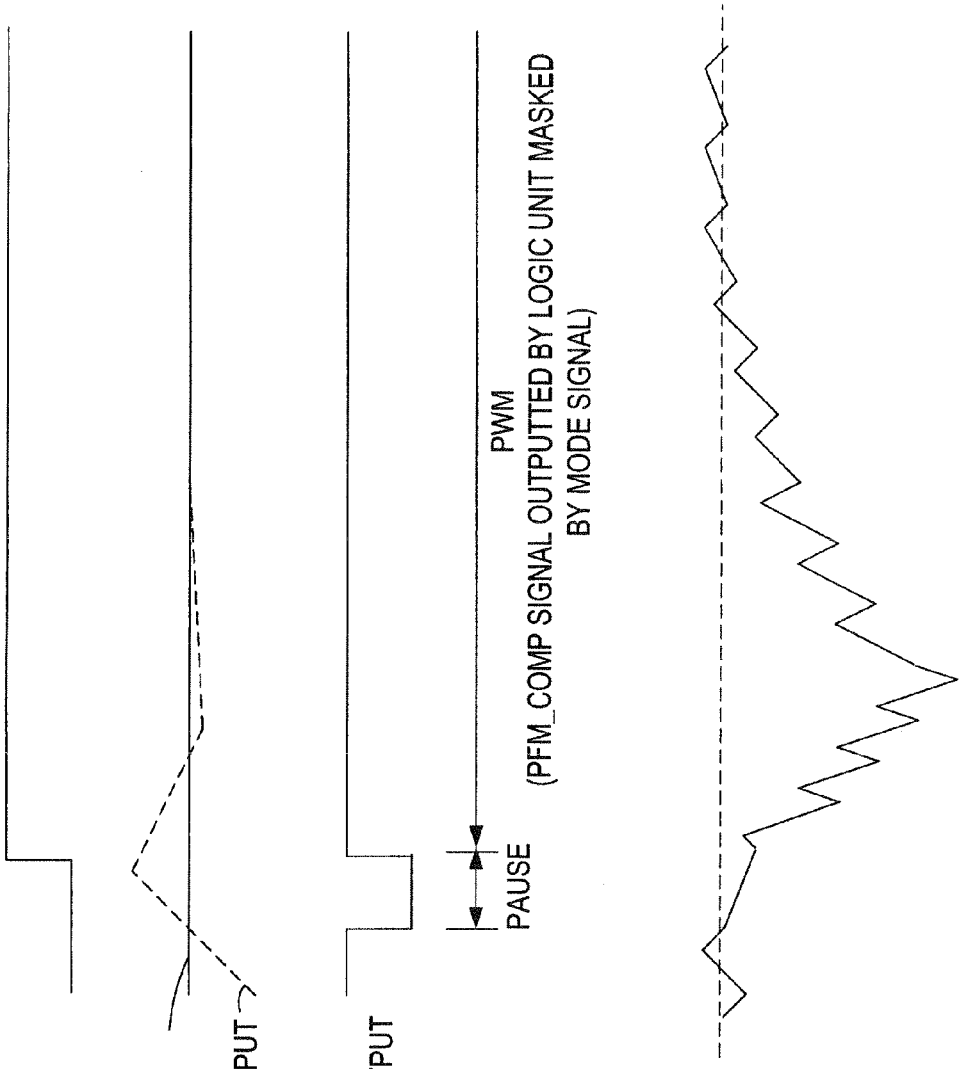

SWITCHING REGULATOR

CROSS-REFERENCE TO RELATED APPLICATION

This application is based upon and claims the benefit of priority of the prior Japanese Patent Application No. 2010-197530, filed on Sep. 3, 2010, the entire contents of which are incorporated herein by reference.

FIELD

The embodiments discussed herein are related to a switching regulator.

BACKGROUND

Power supply circuits are used in electronic devices, such as mobile phones and digital cameras, in which input power is converted to a certain output power. Examples of widely used power supply circuits include, for example, switching regulator (or DC-DC converter), which boast high efficiency and are amenable to size reduction. Using a switching regulator in an electronic device has, for example, the effect of reducing power consumption in the electronic device.

FIG. 12 is a diagram illustrating a configuration example of a switching regulator 200. The switching regulator 200 is supplied with an input voltage, through VIN, and outputs an output voltage, through VOUT, to a load 50. The switching regulator 200 can supply an output voltage VOUT such that no overvoltage occurs at the load 50, by converting the input voltage VIN to a constant voltage having a certain value. The load 50 is, for example, a resistor or an element that consumes power, such a CPU (Central Processing Unit) or the like.

The switching regulator 200 comprises a first and a second switching element 11, 12, a smoothing coil 13, a capacitor 14, a resistor 15, an I/V conversion circuit 16, a first comparator (PWM_COMP) 17, a logic unit 18, an error amplifier (inverting amplifier circuit) 19, a second comparator (PFM_COMP) 20, a clock generator circuit 21, an OR circuit 22, constant voltage sources 25, 26, a capacitor 27, resistors 28, 29, a reverse current detection comparator 30 and an input terminal 31. An integrating circuit 24 comprises the error amplifier 19, the constant voltage source 25 and the capacitor 27.

The switching regulator 200 receives the input of an external control signal (MODE) via the input terminal 31, and, based on this external control signal, operates in a forced PWM (Pulse Width Modulation) mode or a PFM (Pulse Frequency Modulation)/PWM automatic switching mode (hereafter, automatic switching mode). The forced PWM mode is a mode in which, for example, the switching regulator 200 outputs an output voltage VOUT at a given cycle (at a given duty ratio), regardless of the type of the load 50. The automatic switching mode is a mode in which, for example, the switching regulator 200 switches back and forth between PWM operation and PFM operation, in accordance with the type of the load 50, such that the switching regulator 200 operates in PFM when the load 50 is a light load, and in PWM when the load 50 is a heavy load. For example, the switching regulator 200 operates as a forced PWM mode upon input of "HIGH" as an external control signal, and operates as an automatic switching mode, upon input of "LOW". The automatic switching mode can be realized, for example, by intercalating a pause period into a PWM operation (or forced PWM mode).

The operation of the switching regulator 200 in a forced PWM mode will be explained first, followed by an explanation on the operation in an automatic switching mode. FIG. 13A to FIG. 13C are diagrams illustrating waveform examples during a forced PWM mode. The forced PWM mode will be explained below with reference to these waveform diagrams.

In FIG. 12, the logic unit 18, for example, functions as a driving unit that switches on and off the first and second switching elements 11, 12, based on, for example, the output voltage at the first comparator 17.

For example, the logic unit 18 switches on the first switching element (or high-side MOS) 11 and switches off the second switching element (or low-side MOS) 12 when the output voltage of the first comparator 17 is "HIGH". In this case, there is outputted an output voltage VOUT (output voltage VOUT on), of a certain voltage, for the input voltage VIN.

The logic unit 18 switches off the first switching element 11 and switches on the second switching element 12 when, for example, the output voltage of the first comparator 17 is "LOW". In this case, no current flows in the first switching element 11, and hence the output voltage VOUT is off.

The first and second switching elements 11, 12 comprise, for example a pMOS and an nMOS, respectively.

The logic unit 18 switches off the second switching element upon switching on of the first switching element 11, and switches on the second switching element upon switching off of the first switching element 11. The logic unit 18 performs a mutually inverse switching operation on the first and second switching elements. By performing thus this switching operation on the first and second switching elements 11, 12, the logic unit 18 allows an output voltage VOUT of a certain voltage value to be generated, and outputted to the load 50, for the input voltage VIN.

Upon switching on of the first switching element 11, current flows in the resistor 15, and the I/V conversion circuit 16 converts that current to voltage. The I/V conversion circuit 16 outputs the converted voltage to the negative-side input of the first comparator 17. Herein, output voltage is supplied to the load 50 when the first switching element 11 is switched on, and hence a load current flows in the load 50. That is, an increase in the load current that flows in the load 50 entails an increase in the current flowing in the first switching element 11 and a rise in the output voltage of the I/V conversion circuit 16. Conversely, the output voltage of the I/V conversion circuit 16 drops when the load current decreases. Thus, a proportionality relationship exists between the load current and the output voltage of the I/V conversion circuit 16. The I/V conversion circuit 16 outputs, to the first comparator 17, a second signal in the form of an output voltage that is proportional to the load current.

The output voltage from the I/V conversion circuit 16 is inputted to the negative input side of the first comparator 17, while the output voltage of the error amplifier 19 is inputted to the positive input side of the first comparator 17, which decides the pulse width of the output voltage (or duty ratio) of the switching regulator 200. FIG. 13B and FIG. 13C are diagrams illustrating the relationship between the output voltage of the first comparator (PWM_COMP) 17 and the output voltage at a connection point LX between the two switching elements 11, 12. As described above, when the first comparator 17 outputs "HIGH", the logic unit 18 switches on the first switching element 11, and when the first comparator 17 outputs "LOW", the logic unit 18 switches off the first switching element 11. As a result, the first comparator 17 outputs a control signal that switches on or off the first and second switching elements 11, 12, through operation of the logic unit 18. The duty ratio of the output voltage VOUT is decided thereby.

Returning to FIG. 12, the error amplifier 19 is an inverting amplifier circuit that amplifies an error between the output voltage VOUT and a reference voltage Voref, and that outputs a first signal, indicating the amplified error, to the first comparator 17. The output voltage of the error amplifier 19 is considered next.

FIG. 13A is a diagram illustrating an example of the relationship between the output voltage of the error amplifier 19 and the output voltage of the I/V conversion circuit 16. When operating in a forced PWM mode, the switching regulator 200 outputs an output voltage VOUT at a constant duty ratio. Conceivably, however, the output voltage VOUT may drop below a certain voltage value (hereafter, first certain voltage value). The output voltage VOUT is inputted herein to the negative input side of the error amplifier 19, as a result of which there rises the output voltage of the error amplifier 19. When the output voltage of the error amplifier 19 rises, the voltage inputted to the positive input side of the first comparator 17 becomes greater than at a time before a drop in the output voltage VOUT, and hence the time of "HIGH" output becomes likewise longer than before. As a result, the time over which the logic unit 18 switches on the first switching element 11 becomes longer, and the output voltage VOUT rises. Conversely, when the output voltage VOUT is equal to or higher than the first certain voltage value, the switching regulator 200 operates so as to lower the output voltage VOUT, in order to allow supplying an output voltage VOUT at a constant duty ratio. An output voltage VOUT at a constant duty ratio can be preserved as a result of the foregoing. Ordinarily, an output voltage VOUT having a constant duty ratio is outputted when the output voltage of the I/V conversion circuit 16 and the output voltage of the error amplifier 19 are equal. The switching regulator 200 operates thus in a forced PWM mode as described above.

The automatic switching mode is explained next. FIG. 14A to FIG. 14D are diagrams illustrating waveform examples in various units during an automatic switching mode. The automatic switching mode is a mode in which a PWM operation and a PFM operation alternate each other. The PFM operation is performed by intercalating a pause period into a PWM operation.

When the load 50 is a heavy load, for example, the switching regulator 200 operates as a PWM mode, in the same way as in a forced PWM mode. For example, the output voltage of the I/V conversion circuit 16 drops gradually when the load current for the load 50 drops below a certain current value. In a PWM operation, the output voltage of the I/V conversion circuit 16 and the output voltage of the error amplifier 19 are equal. Therefore, the output voltage of the error amplifier 19 drops when the output voltage of the I/V conversion circuit 16 drops.

The output voltage of the error amplifier 19 is inputted to the second comparator 20. When the output voltage of the error amplifier 19 is equal to or lower than the negative input of the second comparator 20 (reference voltage is inputted), the output voltage (PFM_COMP output) of the second comparator 20 switches from "HIGH" to "LOW" (for example, FIG. 14B and FIG. 14C). At this time, "LOW" from the OR circuit 22 is inputted to the logic unit 18, the switching operation is discontinued, and a pause state is entered to. When in the pause state, the switching regulator 200 outputs charge stored in the capacitor 14 as the output voltage VOUT.

Thereafter, the charge stored in the capacitor 14 is outputted to the load 50, and the output voltage VOUT drops yet further. The output voltage of the error amplifier 19 rises then again through a drop in the output voltage VOUT that is inputted to the negative input side of the error amplifier 19. In the second comparator 20, the positive input (output voltage of the error amplifier 19) becomes thereafter equal to or greater than the negative input (reference voltage is inputted). The output voltage (PFM_COMP output) of the second comparator 20 turns then from "LOW" to "HIGH"; "HIGH" from the OR circuit 22 is inputted to the logic unit 18; and a PWM operation is carried out. During the automatic switching mode, the switching regulator 200 alternates between a pause state and a PWM operation (for example, FIG. 14C). By varying of the cycles of the pause period and the PWM operation period, and by varying the proportion therebetween, the switching regulator 200 is brought to a state in which the switching regulator 200 performs overall a PFM operation.

When the load 50 changes from a light load to a heavy load, the output voltage of the error amplifier 19 becomes equal to or higher than the negative input the second comparator 20, as a result of which the second comparator 20 outputs "HIGH" constantly. Accordingly, the logic unit 18 performs a switching operation, and the switching regulator 200 performs a PWM operation constantly. An operation example of an automatic switching mode has thus been described above.

In FIG. 12, the reverse current detection comparator 30 is a comparator that detects a reverse current of the coil current in coil 13 (the reverse current being a current flowing from the output voltage VOUT to GND via the coil 13 and the second switching element 12). The reverse current detection comparator 30 operates during the automatic switching mode. When a reverse current is detected by the reverse current detection comparator 30 (when the reverse current detection comparator 30 outputs "HIGH") in a state where the second switching element 12 is switched on, the logic unit 18 switches off the second switching element 12, to prevent thereby the reverse current. In the switching regulator 200, thus, the power efficiency of the output voltage VOUT can be maintained at a certain efficiency or higher, during an automatic switching mode, through prevention, by the logic unit 18, of a reverse current of the coil current.

Non-patent document 1: A study of the slope compensation scheme of a current-mode DC-DC converter to obtain the input and output independent frequency characteristics, Chihiro KAWABATA and two others, Proceedings of the IEICE General Conference 2008, Electronics (2) 121, 2008-03-05

The problem of the switching regulator 200 is explained below. FIG. 15A to FIG. 15D are diagrams for explaining such problems.

In a PWM operation in an automatic switching mode, as described above, a drop of the load current to a certain current value or lower is accompanied by a drop in the output voltage of the I/V conversion circuit 16, and a drop of the output voltage of the error amplifier 19 to a second certain voltage value or lower. The negative input of the error amplifier 19 increases as a result (for example, FIG. 14A, FIG. 15B). The output voltage of the error amplifier 19 drops when the negative input of the error amplifier 19 becomes equal to or greater than the positive input (reference voltage Voref). The output voltage of the error amplifier 10 is inputted to the positive side of the second comparator 20, such that when the output voltage thereof becomes equal to or lower than the negative input (reference voltage), the second comparator 20 outputs "LOW" to the logic unit 18, and a pause state is entered.

In such a pause state in the automatic switching mode, the logic unit 18 performs a switch operation when "HIGH" (forced PWM mode) is inputted, as a external control signal, to the switching regulator 200. In this case, the negative-side input voltage of the error amplifier 19 becomes higher than the positive-side reference voltage Voref (for example, FIG. 15B). As a result, the switching regulator 200 incorrectly outputs an output voltage VOUT equal to or higher than the first certain voltage value. The negative-side input voltage in the error amplifier 19 is now higher than the positive-side reference voltage Voref, and the output voltage of the error amplifier 19 (positive-side input voltage of the first comparator 17) becomes equal to or lower than the negative input side voltage of the first comparator 17. The first comparator 17 causes the logic unit 18 to operate so as to shorten the on-time of the first switching element 11, to reduce the output voltage VOUT. As a result, the output voltage VOUT of the switching regulator 200 swings considerably to a negative voltage, as illustrated in FIG. 15D.

Thus, the output voltage fluctuates significantly when a forced PWM mode is inputted, as an external control signal, while the switching regulator 200 is in a pause state in an automatic switching mode.

SUMMARY

According to one aspect of the invention, a switching regulator for converting an input voltage to a certain constant voltage and outputting the constant voltage, as an output voltage, to a load, the switching regulator includes: first switching element and second switching element; a logic unit which outputs to the load the output voltage converted from the input voltage to the constant voltage, by causing the first switching element and the second switching element to perform a switching operation; an error amplifier which inputs the output voltage and first reference voltage, and outputs first signal indicating an error between the output voltage and the first reference voltage; first comparator which inputs the first signal and second signal indicating an output voltage that is proportional to load current flowing in the load, and outputs to the logic unit control signal causing the logic unit to perform the switching operation based on the first signal and the second signal; and a correction unit which is connected to an input side of the error amplifier, and corrects an input voltage of the error amplifier to reduce the input voltage to a certain value or lower.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13A to FIG. 13C are diagrams illustrating waveform examples during a forced PWM mode;

FIG. 14A to FIG. 14D are diagrams illustrating waveform examples during an automatic switching mode; and FIG. 15A to FIG. 15D are diagrams illustrating waveform examples during mode switching.

DESCRIPTION OF EMBODIMENTS

Embodiments for carrying out the invention are explained next.

<Example of an Overall Configuration>

Figure 1:
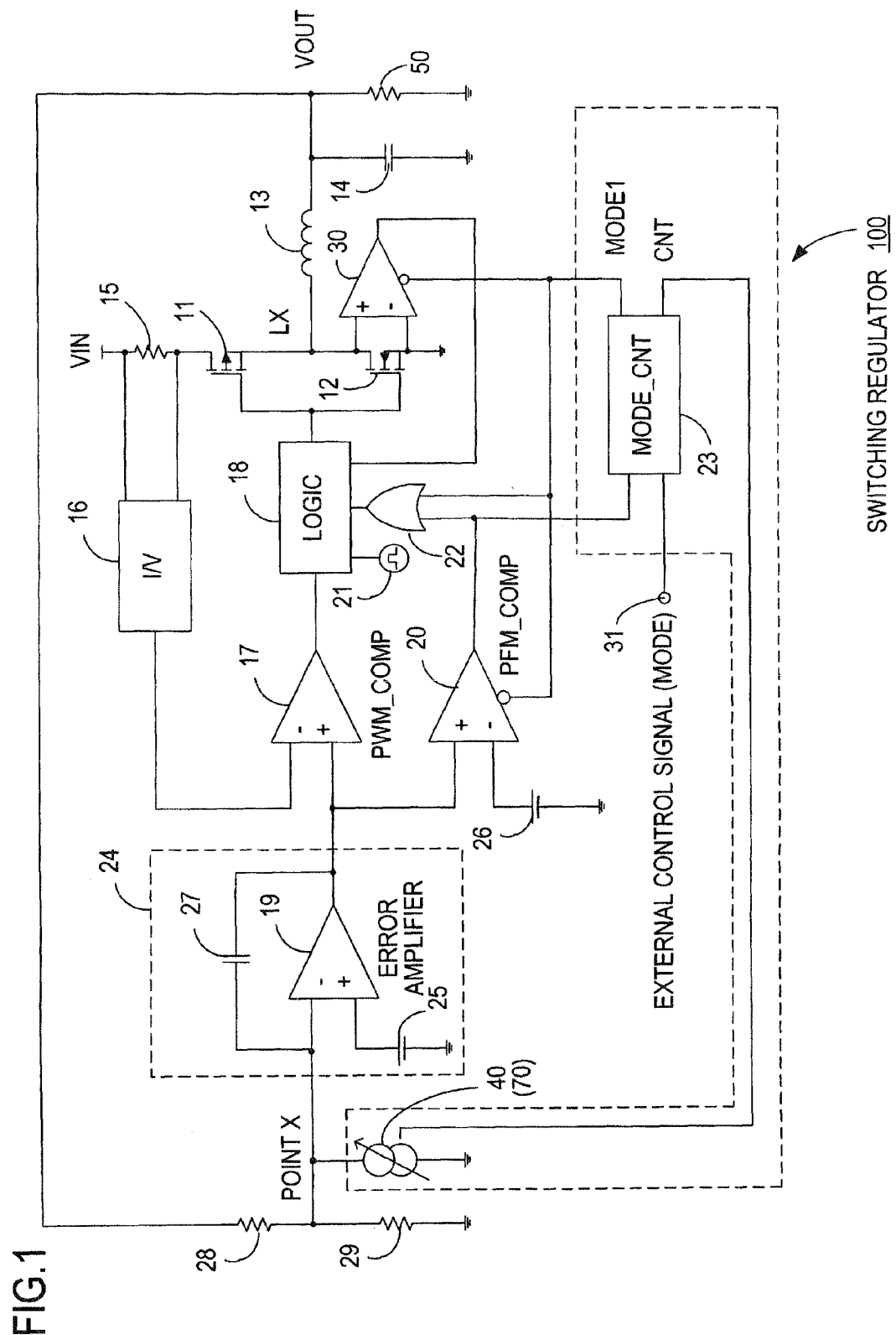
FIG. 1 is a diagram illustrating a configuration example of a switching regulator.
Figure 11:
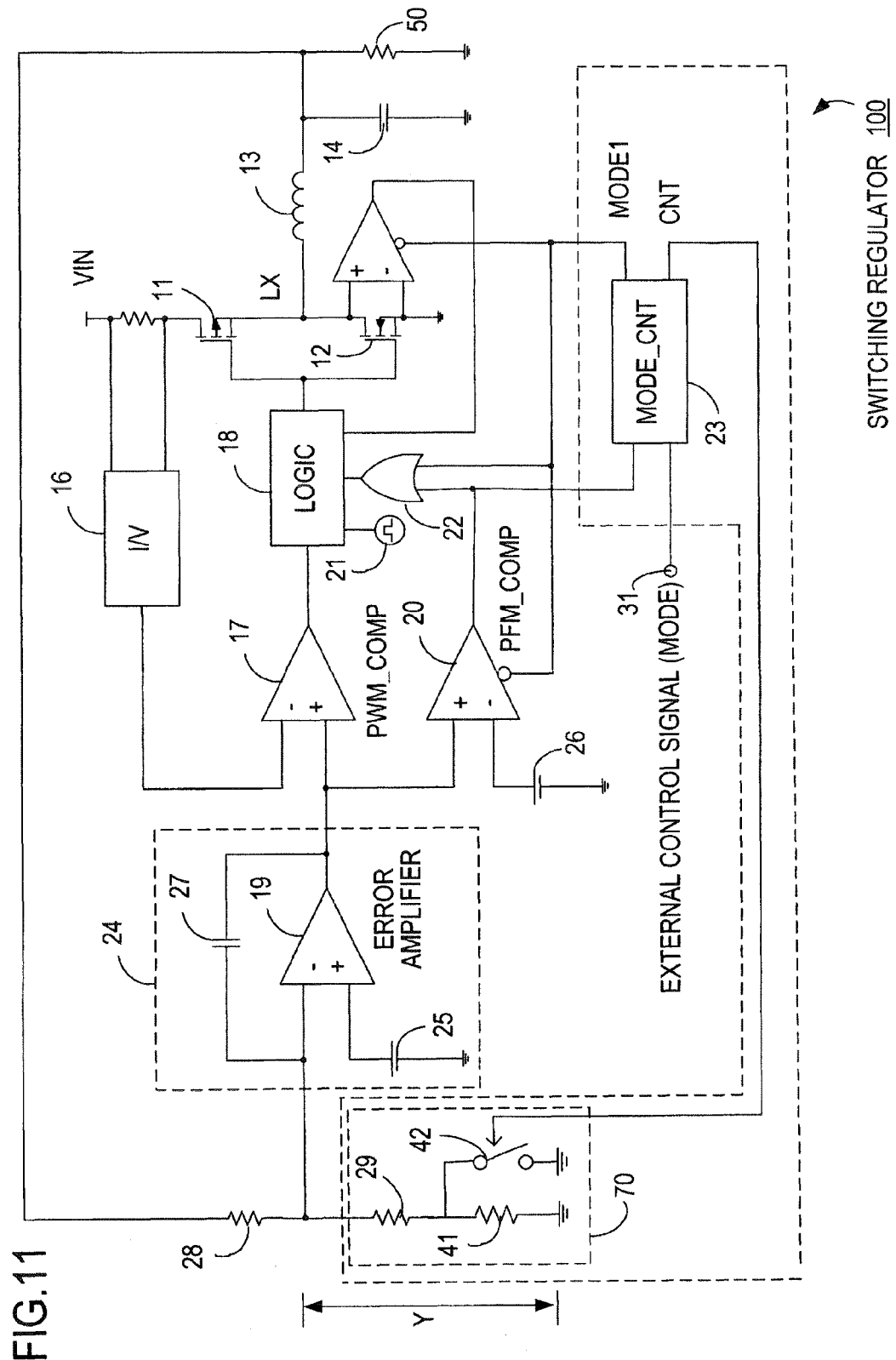
FIG. 11 is a diagram illustrating another configuration example of a switching regulator.
Figure 12:
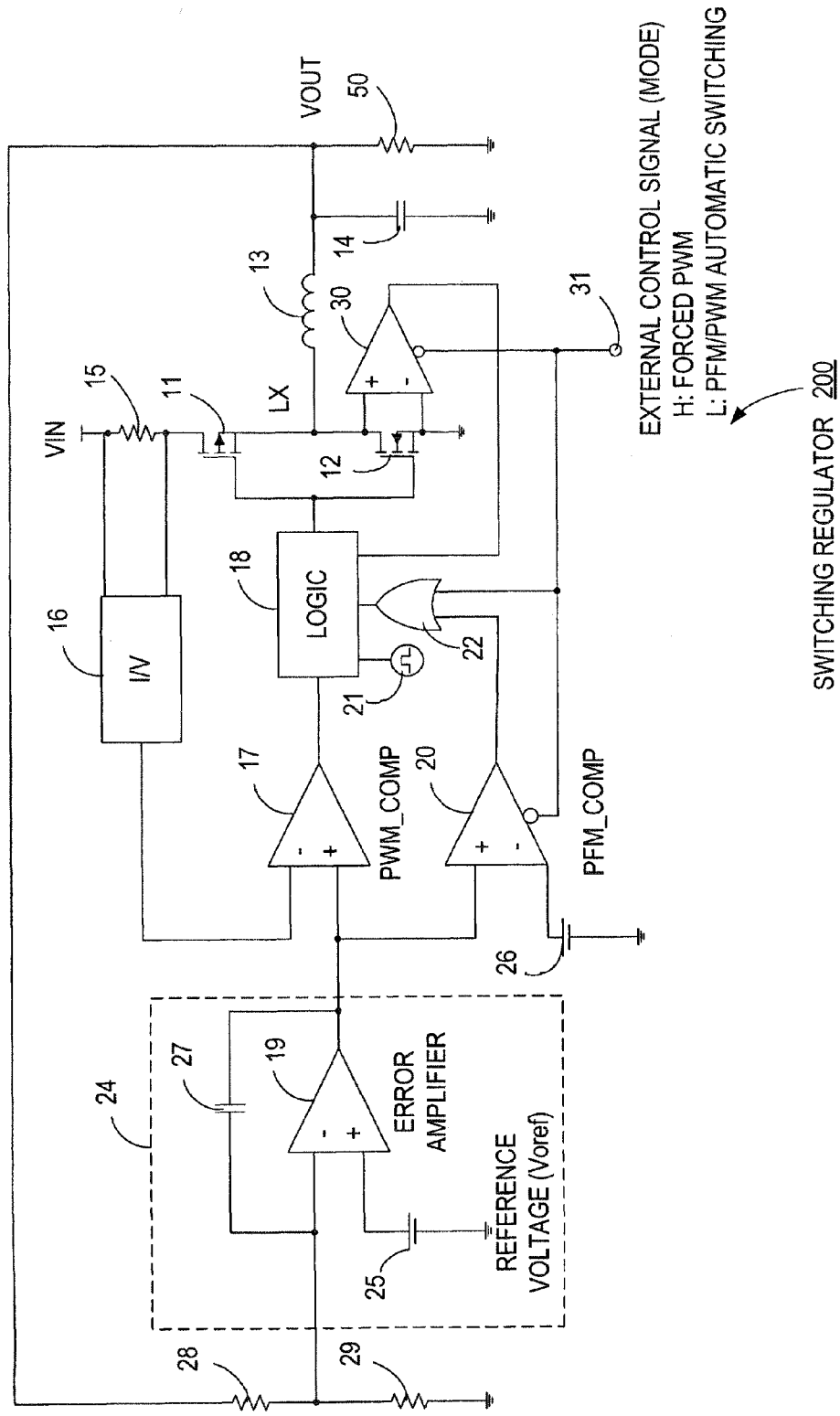
FIG. 12 is a diagram illustrating a configuration example of a switching regulator.

An example of the overall configuration of a switching regulator will be explained first. FIG. 1 is a diagram illustrating a configuration example of a switching regulator 100. Constituent elements identical to those of FIG. 11 are denoted with the same reference numerals.

The switching regulator 100 further comprises a mode control circuit (MODE_CNT) 23 and an error amplifier correction current source 40.

The mode control circuit 23 receives the input of an external control signal (MODE) and an output voltage of a second comparator (PFM_COMP) 20, and outputs a control signal (CNT) to a error amplifier correction current source 40, and a mode signal (MODE1) to a reverse current detection comparator 30 and the second comparator 20.

The control signal (CNT) outputted by the mode control circuit 23 is, for example, a control signal for operating the error amplifier correction current source 40. The mode control circuit 23 causes the error amplifier correction current source 40 to operate by outputting "HIGH", as the control signal (CNT), in response to the external control signal (MODE) and a signal from the second comparator (PFM_COMP) 20, and discontinues the operation of the error amplifier correction current source 40 by outputting "LOW".

The mode signal (MODE1) is a control signal for operating the reverse current detection comparator 30 and the second comparator 20. The mode control circuit 23, for example, outputs "LOW" when the external control signal is "LOW" (automatic switching mode), to operate the reverse current detection comparator 30 and the second comparator 20. A detailed configuration example and so forth of the mode control circuit 23 will be explained further on.

The external control signal (MODE) is inputted via an input terminal 31, and indicates, for example, a forced PWM mode, when "HIGH", and an automatic switching mode, when "LOW". The switching regulator 100 shifts to a forced PWM mode or an automatic switching mode based on the input of the external control signal (MODE), and operates according to the respective mode.

The error amplifier correction current source 40 outputs a correction current based on the control signal (CNT). The negative-side input voltage of an error amplifier 19 can be reduced to a certain value or lower by way of the correction current that the error amplifier correction current source 40 outputs to the negative input side of the error amplifier 19. FIG. 1 illustrates the error amplifier correction current source 40 as an example of a correction unit 70 that corrects the input voltage in such a manner that the latter is reduced to a certain value or lower.

In a pause state during a automatic switching mode, as described above, the switching regulator 100 is brought to a state such that the negative-side input voltage of the error amplifier 19 is higher than a reference voltage (for example, FIG. 15B). In this state, a shift to a forced PWM mode causes the output voltage VOUT to swing considerably towards a negative voltage. Accordingly, the negative-side input voltage of the error amplifier 19 is reduced to a certain value or lower, by way of the correction current outputted by the error amplifier correction current source 40, so that fluctuation of the output voltage VOUT can be suppressed as a result. A detailed configuration example and so forth of the error amplifier correction current source 40 will be explained further on.

The operation of the switching regulator 100 as a whole will be described next. The mode control circuit 23 and the error amplifier correction current source 40 will be explained in detail thereafter.

<Overall Operation Example>

FIG. 2A to FIG. 2G are diagrams illustrating waveform examples in the various units of the switching regulator 100, in an example where a pause state in an automatic switching mode shifts to a forced PWM mode. The operation will be explained with reference to these drawings.

In the automatic switching mode, the second comparator 20 outputs "LOW", as a third signal, whereupon the logic unit 18 is brought to a pause state (for example, FIG. 2C and FIG. 2D), when the output voltage (or first signal) of the error amplifier 19 becomes equal to or lower than the negative-side input voltage (reference voltage) of the second comparator 20. In this case, the output voltage of the error amplifier 19 becomes equal to or lower than the second certain voltage value and equal to or higher than a reference voltage Voref at the negative input side of the error amplifier 19 (for example, FIG. 2B).

In this state, the mode control circuit 23 outputs "HIGH" as the control signal (CNT) (for example, FIG. 2E), upon input (FIG. 2A) of "HIGH" (forced PWM mode) as the external control signal. The error amplifier correction current source 40 outputs a correction current as a result.

By way of this correction current, the input voltage at the negative input side of the error amplifier 19 drops faster than in a conventional case (for example, as denoted by the dotted line in FIG. 2B), such that the time by which the input voltage becomes equal to the reference voltage Voref is shorter than in a conventional case.

Figure 2:
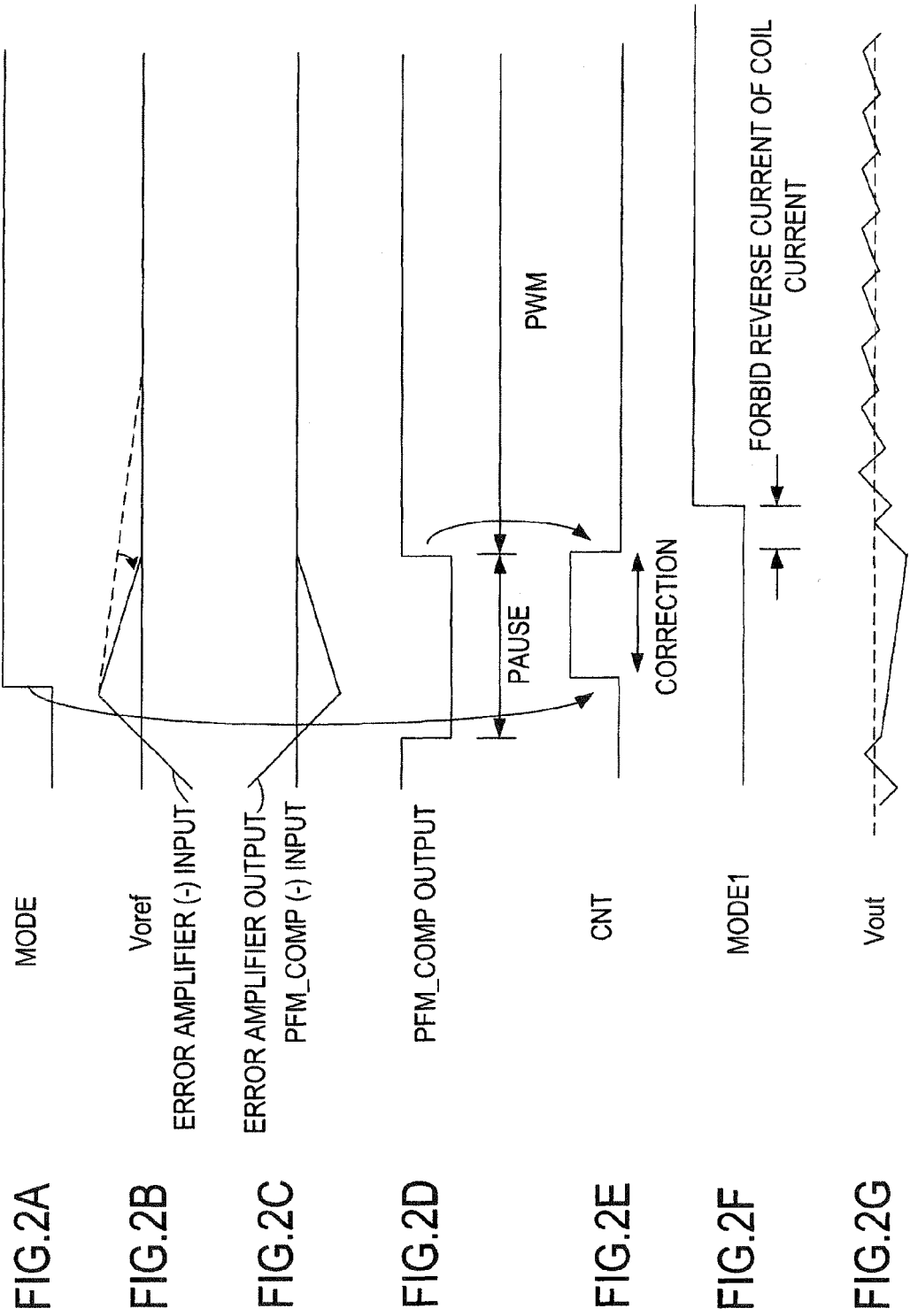
FIG. 2A to FIG. 2G are diagrams illustrating waveform examples during mode switching.

The output voltage of the error amplifier 19 rises gradually upon a drop in the negative input side voltage of the error amplifier 19 (for example, FIG. 2C). When the negative input side voltage of the error amplifier 19 becomes lower than that on the positive input side, the output voltage of the error amplifier 19 becomes higher than the reference negative input side voltage, and the second comparator 20 outputs "HIGH" (for example, FIG. 2D).

The mode control circuit 23 outputs "LOW" as the control signal (CNT) upon detecting the "HIGH" outputted, as a third signal, by the second comparator 20. As a result, the output of correction current by the error amplifier correction current source 40 is discontinued (for example, FIG. 2E).

The logic unit 18 performs a PWM operation upon detecting the output of "HIGH" by the second comparator 20. Through launching this PWM operation, the first comparator 17 detects, based on the output voltage (or second signal) of the I/V conversion circuit 16, that the output voltage VOUT is equal to or lower than a first certain voltage value. When the negative input side voltage (output voltage VOUT) of the error amplifier 19 becomes equal to or lower than the reference voltage Voref, the output voltage of the error amplifier 19 rises to be equal to or higher than the second certain voltage value. In the first comparator 17, the first signal (output voltage of the error amplifier 19) becomes higher than the second signal (output voltage of the I/V conversion circuit 16). As a result, the first comparator 17 outputs "HIGH", and the logic unit 18 is controlled so as to switch on the first switching element 11. The output voltage VOUT can be raised as a result (for example, FIG. 2G).

That is, the mode control circuit 23 discontinues the correction current upon detection, from the second comparator 20, as a result of a shift to the PWM mode. At that time, the logic unit 18 as well performs a switching operation, as a result of which fluctuation in the output voltage VOUT is suppressed.

In the switching regulator 100, as a result, fluctuation of the output voltage VOUT can be suppressed also upon switching to a forced PWM mode when a pause state is entered to in an automatic switching mode.

When the output voltage of the second comparator 20 is "HIGH" (PWM mode), the logic unit 18 performs a switching operation on account of the output voltage "HIGH" from the second comparator 20. In such a state, the output voltage VOUT is controlled as an ordinary PWM operation and the fluctuation thereof is suppressed, with no change in the switching operation by the logic unit 18, even if "HIGH" (forced PWM mode) is inputted as the external control signal.

For example, as described above, when the output voltage VOUT becomes equal to or lower than the first certain voltage value, the output voltage of the error amplifier 19 becomes a voltage that is higher than the negative input of the first comparator 17 (first signal higher than the second signal). In this case, the output voltage of the first comparator 17 is "HIGH". Accordingly, the logic unit 18 switches on the first switching element 11, and raises the output voltage VOUT. When the output voltage VOUT becomes greater than the first certain voltage value, the output voltage of the error amplifier 19 becomes equal to or lower than the negative input side voltage of the first comparator 17. The first comparator 17 outputs "LOW", since the output voltage of the I/V conversion circuit 16 (second signal) is higher than the output voltage of the error amplifier (first signal). As a result, the first comparator 17 is controlled in such a way so as output, to the logic unit 18, a control signal to the effect of switching off the first switching element 11. The output voltage VOUT drops as a result. In the PWM operation (forced PWM mode), the switching regulator 100 repeats the above operation, to suppress as a result fluctuation of the output voltage VOUT.

In this case, the mode control circuit 23 does not output "HIGH" as the control signal (CNT), since the output of the second comparator 20 is "HIGH". Accordingly, no correction current is outputted (for example, FIG. 2E).

Also, the output voltage VOUT does not fluctuate significantly upon change from "HIGH" (forced PWM mode), as the external control signal, to "LOW" (automatic switching mode). The reasons for this are explained below.

<Reasons why the Output Voltage VOUT does not Fluctuate Significantly Upon Shift from a Forced PWM Mode to an Automatic Switching Mode>

FIG. 3A to FIG. 3E are diagrams illustrating waveform examples of an example of operation in the PWM mode before and after shifting from a forced PWM mode to an automatic switching mode.

Figure 3:
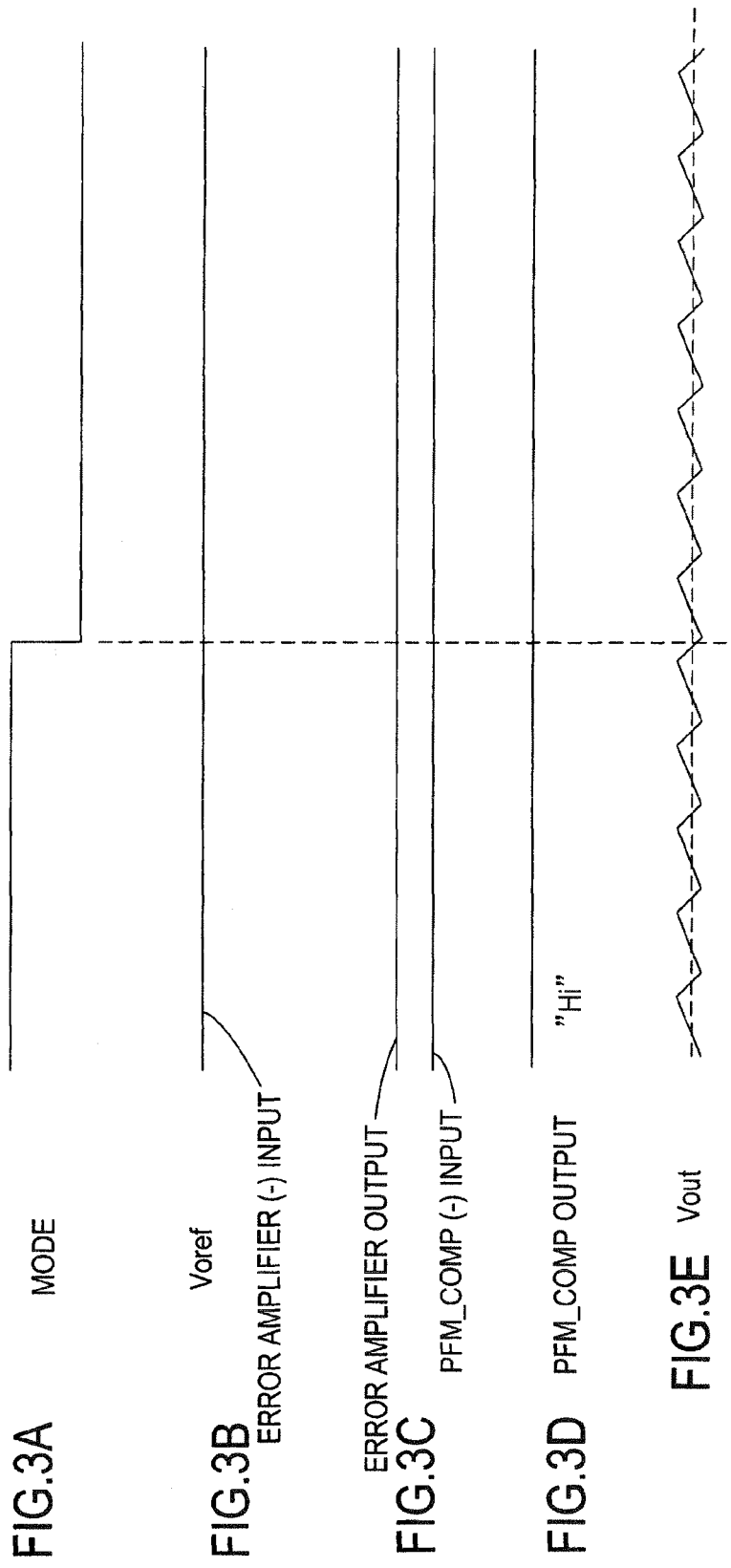
FIG. 3A to FIG. 3E are diagrams illustrating waveform examples during mode switching.

Even when an external control signal is switched from "HIGH" to "LOW" (for example, FIG. 3A), the output voltage of the second comparator (PFM_COMP) 20 is "HIGH" (PWM mode) before and after switching (for example, FIG. 3C). Therefore, the switching operation in the logic unit 18 does not change. That is, the logic unit 18 performs a switching operation during a forced PWM mode. Even in an automatic switching mode at that time, the output voltage of the second comparator 20 in a state of performing a PWM operation is "HIGH", and the logic unit 18 goes on performing the switching operation. Fluctuation of the output voltage VOUT is suppressed, as described above, when a switching operation is being performed in the switching regulator 100 (for example, FIG. 3E).

FIG. 4A to FIG. 4E are diagrams illustrating waveform examples in a case where a pause state follows immediately a shift from a forced PWM mode to an automatic switching mode.

Figure 4:
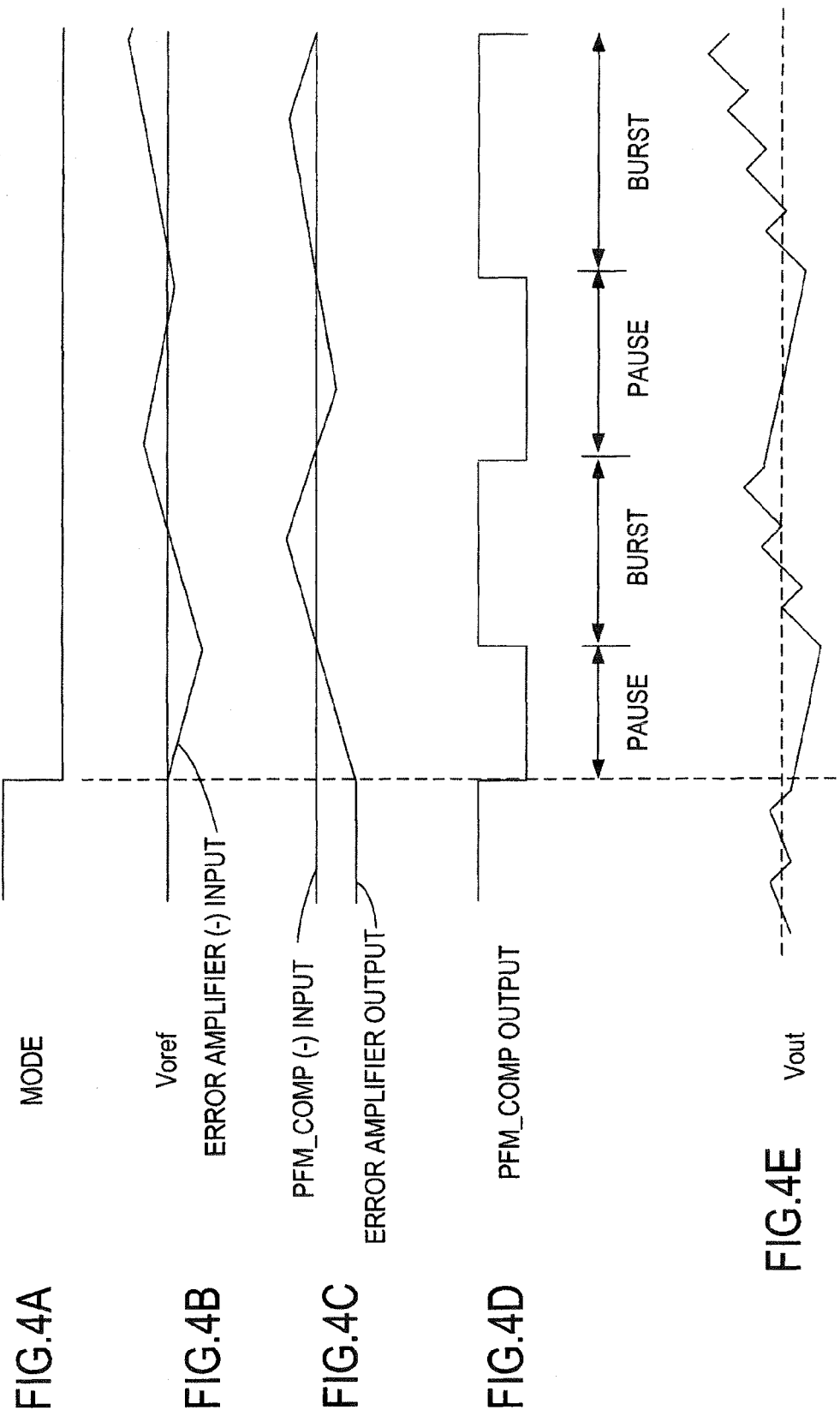
FIG. 4A to FIG. 4E are diagrams illustrating waveform examples during mode switching.

After mode shift, the output voltage of the second comparator 20 is "LOW", whereby the logic unit 18 enters a pause state (for example, FIG. 4D).

Upon entering a pause state, the output voltage VOUT drops gradually. In this case, the output voltage VOUT is outputted to the negative input side of the error amplifier 19, as a result of which the output voltage of the error amplifier 19 rises contrariwise (for example, FIG. 4C).

At the second comparator 20, the positive-side input voltage (output voltage of the error amplifier 19) becomes higher than the negative-side reference voltage, and hence "HIGH" is outputted. As a result, the logic unit 18 performs a switching operation (performs a PWM operation) (for example, FIG. 4D).

Ultimately, the switching regulator 100 operates in ordinary PFM of repeating a pause state and a state (burst state) of carrying out a PWM operation. Although the output voltage VOUT drops in the pause state, fluctuation of the output voltage VOUT can be suppressed in the state in which the PWM operation is carried out. Fluctuation of the output voltage VOUT is suppressed thus overall.

As described above, the output voltage VOUT does not fluctuate beyond a given extent, even upon a shift from a forced PWM mode to an automatic switching mode.

The mode control circuit 23 and the error amplifier correction current source 40 are explained in detail next.

<Mode Control Circuit>

The mode control circuit 23 is explained in detail next. The mode control circuit 23, for example, outputs "HIGH" as the control signal (CNT) upon input of "HIGH" as the external control signal (MODE) when the output voltage of the second comparator 20 is "LOW" (pause state) (forced PWM mode). As a result, the mode control circuit 23 switches on the error amplifier correction current source 40.

In this state, the mode control circuit 23 outputs "LOW", as the control signal (CNT), when the output voltage of the second comparator 20 is "HIGH" (PWM mode). As a result, the mode control circuit 23 switches off the error amplifier correction current source 40.

Upon input of "LOW" as the external control signal, the mode control circuit 23 outputs "LOW" as the mode signal (MODE1), to operate the reverse current detection comparator 30 and the second comparator 20.

Figure 5:
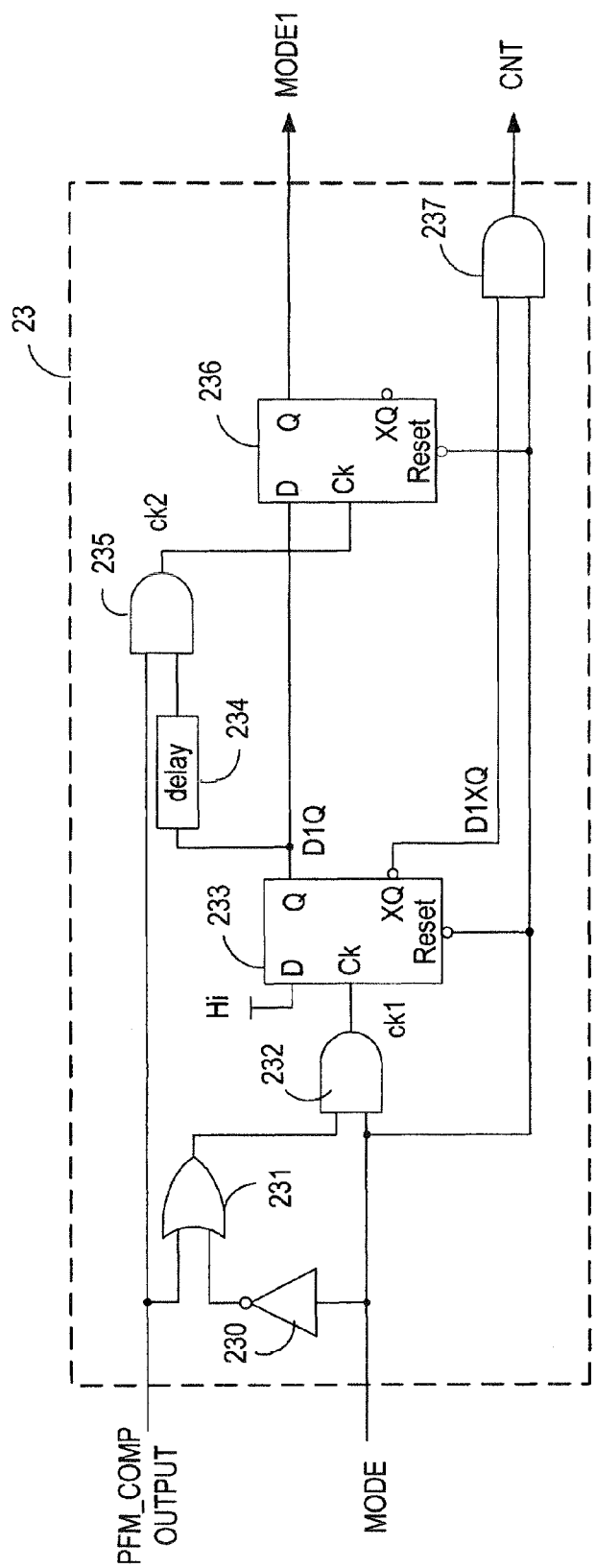
FIG. 5 is a diagram illustrating a configuration example of a mode control circuit.

The mode control circuit 23 may have a circuit configuration that allows maintaining an input-output relationship such as the above-described one. FIG. 5 is a diagram illustrating an configuration example of the mode control circuit 23. The mode control circuit 23 comprises a NOT circuit 230, an OR circuit 231, a first AND circuit 232, a first D-type flip-flop 233, a delay circuit 234, a second AND circuit 235, a second D-type flip-flop circuit 236, and a third AND circuit 237.

FIG. 6A to FIG. 6H are diagrams illustrating waveform examples of various units of the mode control circuit 23. The operation of the mode control circuit 23 will be explained with reference to FIG. 6A to FIG. 6H.

When the external control signal (MODE) is "LOW" (automatic switching mode) an external control signal "LOW" is inputted to the "Reset" input of the first D-type flip-flop 233, whereby the first D-type flip-flop is reset. Thereupon, a "LOW" output voltage is outputted from a Q output (DIQ), and a "HIGH" output voltage is outputted from a XQ output (DIXQ), of the first D-type flip-flop 233 (for example, FIG. 6E and FIG. 6F). The external control signal and the XQ output of the first D-type flip-flop 233 are inputted to the third AND circuit 237. However, the external control signal is "LOW", and hence the output voltage thereof is "LOW". As a result, the mode control circuit 23 outputs "LOW", as a control signal (CNT), to the error amplifier correction current source 40 (for example, FIG. 6G). By contrast, "LOW" is inputted as well to a "Reset" input of the second D-type flip-flop 236, and hence "LOW" is outputted by the Q output of the second D-type flip-flop 236. Accordingly, the mode control circuit 23 outputs "LOW" as a mode signal (MODE1) (for example, FIG. 6H).

Next, upon input of "HIGH" (forced PWM mode) as the external control signal, an output voltage ck1 of the first AND circuit 232 is "LOW", and the output voltages at the Q output and the XQ output of the first D-type flip-flop 233 are held at "LOW" and "HIGH" states, respectively. Both inputs input of the third AND circuit 237 are "HIGH", and hence "HIGH" is outputted. In this case, therefore, the mode control circuit 23 outputs "HIGH" as the control signal (CNT). By contrast, the output voltage of the second comparator 20 is "LOW", and hence an output voltage ck2 of the second AND circuit 235 remains at "LOW", and the voltage at the Q output of the second D-type flip-flop 236 is outputted as "LOW", which is the voltage of the Q output of the first D-type flip-flop 233. In this case, accordingly, the mode control circuit 23 outputs "LOW" as the mode signal (MODE1) (for example, FIG. 6H).

Figure 6:
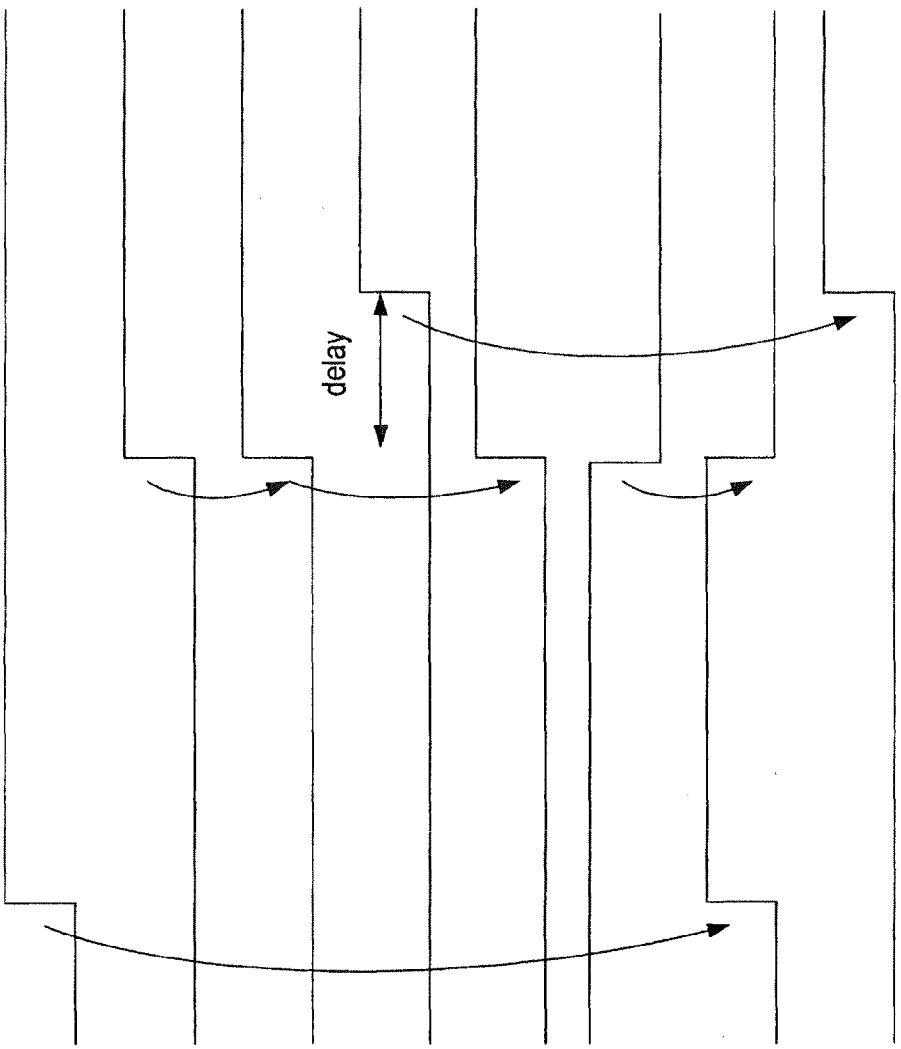
FIG. 6A to FIG. 6H are diagrams illustrating waveform examples in a mode control circuit.

Next, when the output voltage of the second comparator 20 is "HIGH" (PWM mode), the output voltage ck1 of the first AND circuit 232 is "HIGH", the voltage at the Q output of the first D-type flip-flop 233 is "HIGH", and the voltage at the XQ output is "LOW" (for example, FIG. 6C, FIG. 6E and FIG. 6F). One of the input voltages (XQ output of the first D-type flip-flop 233) at the third AND circuit 237 is "LOW", and hence the output voltage is "LOW". In this case, therefore, the mode control circuit 23 outputs "LOW" as the control signal (CNT). Meanwhile, "HIGH", as the voltage at the Q output of the first D-type flip-flop 233, is inputted to the second AND circuit 235 via the delay circuit 234. The output voltage ck2 of the second AND circuit 235 is outputted as "HIGH" after a certain time has elapsed since the output of the second comparator 20 becomes "HIGH". The voltage at the Q output of the second D-type flip-flop 236 as well is outputted as "HIGH" after a certain time has elapsed since the output of the second comparator 20 becomes "HIGH". In this case, therefore, the mode control circuit 23 outputs "HIGH" as the mode signal (MODE1).

The operation of the mode control circuit 23 has been thus explained as described above.

The mode signal (MODE1) does not become "HIGH" upon shift from a pause state in an automatic switching mode to a PWM operation state (second comparator output is "HIGH"), but the mode signal (MODE1) becomes "HIGH" after a certain period of time has elapsed. In the reverse current detection comparator 30, as a result, the period of time until the operation is discontinued (mode signal discontinued upon input of "HIGH") is extended by a certain period of time, and the period of time for detecting a reverse current of the current that flows in the second switching element 12 is likewise extended by a certain period of time.

<Error Amplifier Correction Current Source>

The error amplifier correction current source 40 is explained in detail next. The error amplifier correction current source 40, for example, outputs a correction current when the control signal (CNT) of the mode control circuit 23 is "HIGH", and discontinues the operation when the control signal (CNT) of the mode control circuit 23 is "LOW". This correction current may be set such that the negative-input side voltage of the error amplifier 19 is reduced to a certain value or lower (for example, FIG. 2B). FIG. 7 to FIG. 10B are diagrams illustrating configuration examples of the error amplifier correction current source 40 that operates in such a manner.

Figure 7:
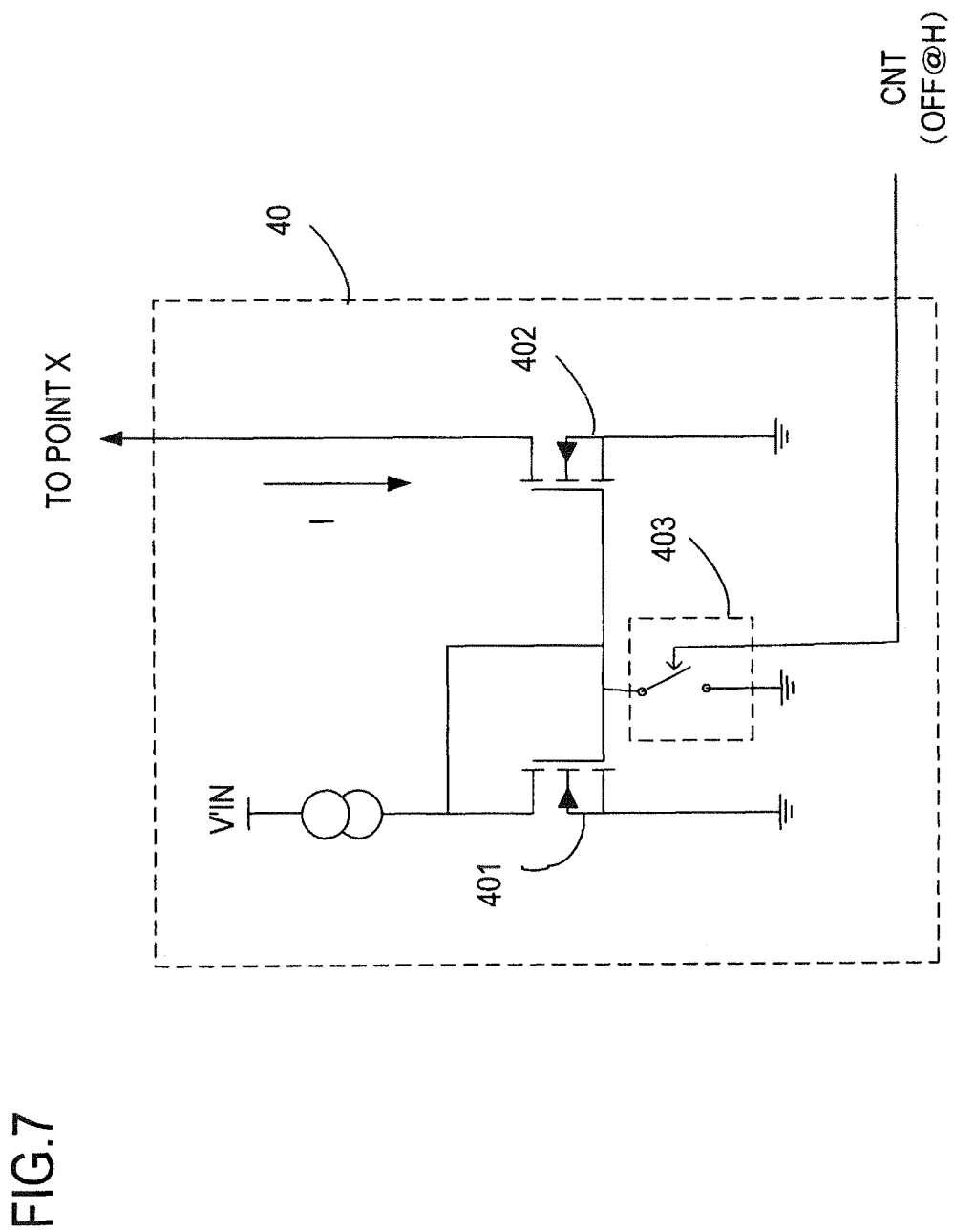
FIG. 7 is a diagram illustrating a configuration example of an error amplifier correction current source.

FIG. 7 will be explained first. The error amplifier correction current source 40 illustrated in FIG. 7 comprises a constant current source (V'IN), a first and a second nMOS 401, 402, and a switching circuit 403. The sources of the first and second nMOS 401, 402, which are connected to each other and connected to ground, make up a current mirror circuit. The drain side of the second nMOS 402 is connected to a point X (for example, FIG. 1), and is connected to the negative input side of the error amplifier 19 via this point X.

An operation example of the error amplifier correction current source 40 is as follows. The switching circuit 403 is switched on upon input of "LOW", as the control signal (CNT), by the mode control circuit 23. As a result, the current outputted by the constant current source (V'PIN) does not flow to the second nMOS 402, but to a ground plane, via the switching circuit 403. Current does not flow from the constant current source (V'IN) to the second nMOS 402, and hence there flows no correction current. The switching circuit 403 is switched off when "HIGH", as the control signal (CNT), is inputted to the switching circuit 403. As a result, a constant current from the constant current source (V'IN) flows to the first and second nMOS 401, 402, and a correction current I flows to the drain side of the second nMOS 402 in the direction indicated by the arrow in FIG. 7. By way of the correction current I, the negative input side voltage of the error amplifier 19 is lowered to a certain value or lower.

Figure 8A:
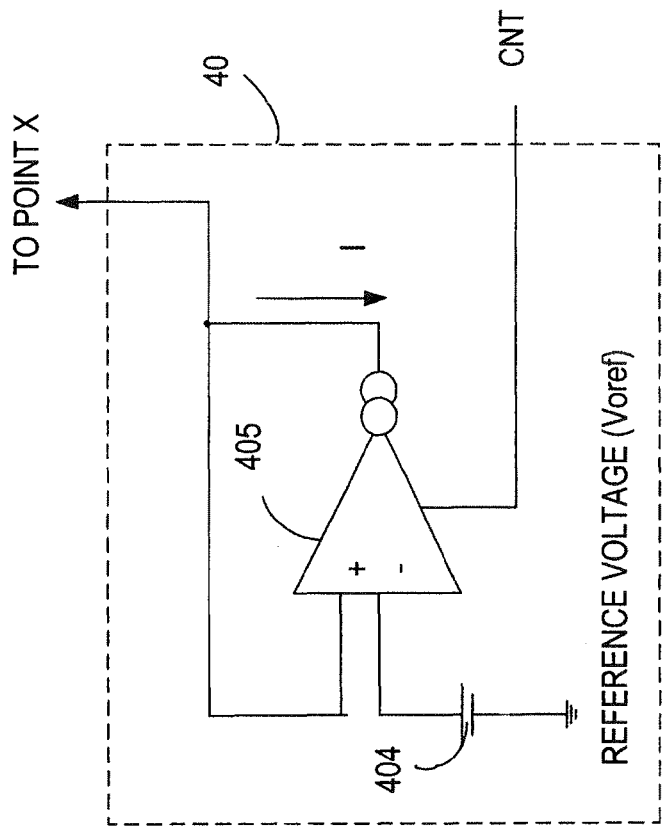
FIG. 8A is a diagram for explaining a configuration example of a error amplifier correction current source.
Figure 8B:
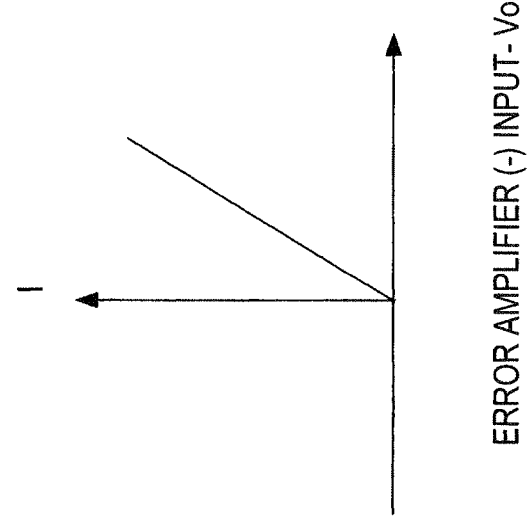
FIG. 8B is a diagram for explaining an operation example thereof.

FIG. 8A illustrates a configuration example of another error amplifier correction current source 40. The error amplifier correction current source 40 comprises a Gm amplifier (inverting amplifier circuit) 405 and a constant voltage source 404. The Gm amplifier 405, for example, operates as a transconductance amplifier that converts voltage into current. The constant voltage source 404 supplies a voltage value that is identical to the reference voltage Voref that is inputted to the positive-side error amplifier 19.

The operation is for example as follows. Specifically, the Gm amplifier 405 does not operate upon input of "LOW" as the control signal (CNT), but the Gm amplifier 405 operates upon input of "HIGH". The correction current I flows in the direction indicated in FIG. 8A when the reference voltage Voref is inputted to the negative-side input of the Gm amplifier 405 and the positive-side input voltage is higher than that reference voltage Voref. The positive-side input of the Gm amplifier 405 is connected to the negative-side input of the error amplifier 19, via the point X. Ultimately, the correction current I is outputted (for example, FIG. 8B) when the negative-side input voltage of the error amplifier 19 becomes higher than the reference voltage Voref. The Gm amplifier 405 outputs the correction current I according to the difference between the reference voltage and the input voltage of the error amplifier 19.

Figures 9A, 9B:
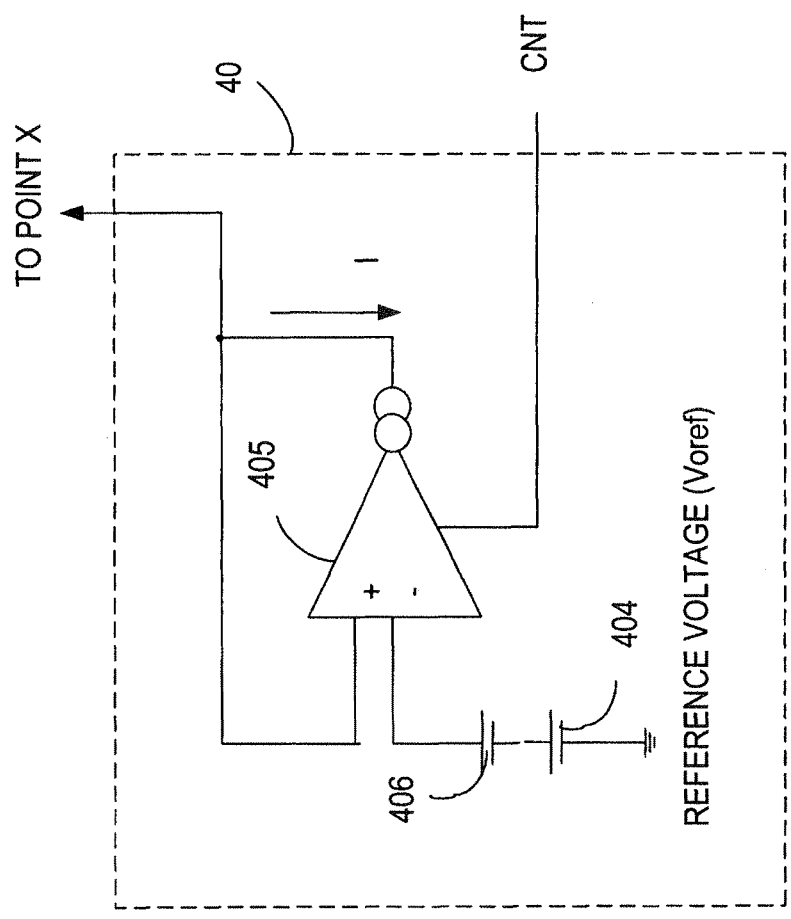
FIG. 9A is a diagram for explaining a configuration example of a error amplifier correction current source.
FIG. 9B is a diagram for explaining an operation example thereof.

FIG. 9A illustrates a configuration example of the error amplifier correction current source 40. The error amplifier correction current source 40 illustrated in FIG. 9A further comprises, with respect to the error amplifier correction current source 40 illustrated in FIG. 8A, a constant voltage source 406 for applying an offset voltage. Even if the negative-side input voltage of the error amplifier 19 is higher than the reference voltage Voref, the correction current does not flow at once. The reference correction current I flows when the former voltage is higher than the latter by a certain voltage (for example, FIG. 9B). The Gm amplifier 405 outputs the correction current I according to the difference between the reference voltage and the input voltage of the error amplifier 19 and that includes the offset voltage. The feature wherein the negative-side input voltage of the error amplifier 19 is reduced to a certain value or lower, by way of the correction current I, is identical to the example in FIG. 8A. Herein, however, the correction current I flows after a certain period of time, in consideration of, for example, delay in other circuit components.

Figure 10A:
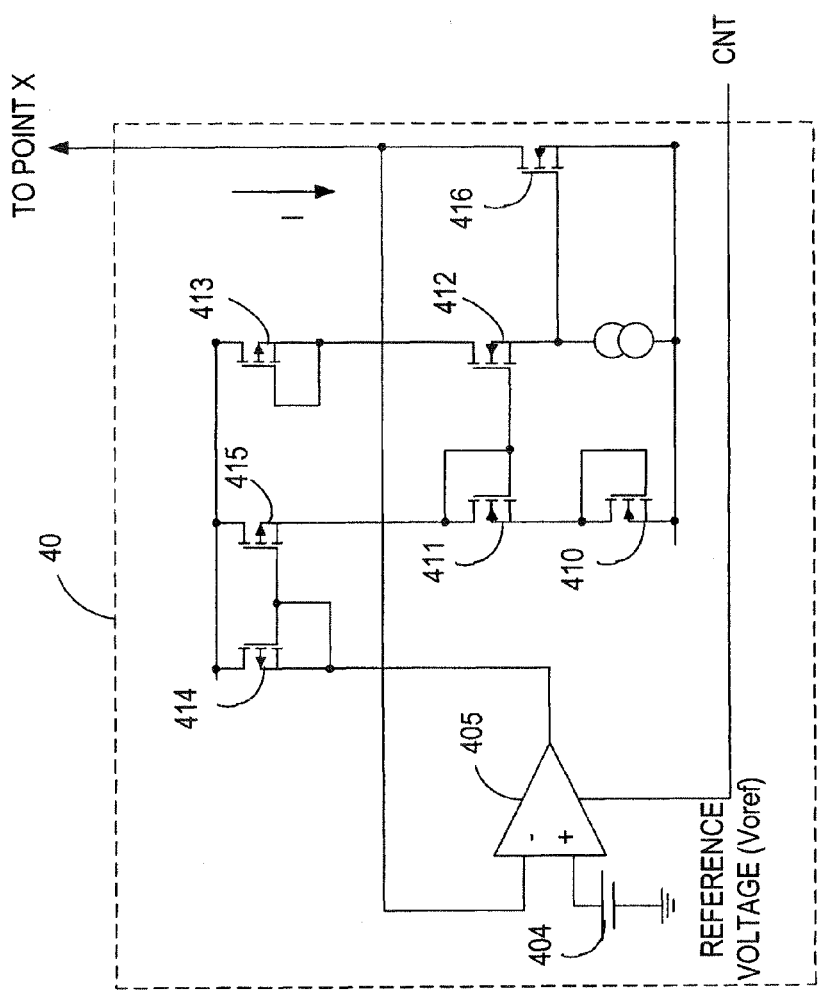
FIG. 10A is a diagram for explaining a configuration example of a error amplifier correction current source.
Figure 10B:
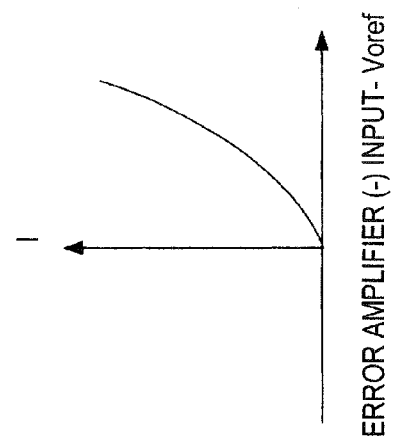
FIG. 10B is a diagram for explaining an operation example thereof.

FIG. 10A illustrates a configuration example of the error amplifier correction current source 40. In this error amplifier correction current source 40, a plurality of nMOS 410 to 416 is connected before and after the Gm amplifier 405. Some of the plurality of nMOS 410 to 416 form a current mirror circuit, and some make up a translinear circuit. The translinear circuit is, for example, a circuit connected in such a manner that when the number of semiconductor elements in a clockwise direction and the number of semiconductor elements in a counterclockwise direction are identical, in a closed loop, then a product of current densities in the clockwise direction and a product of current densities in the counterclockwise direction are identical. In the example of FIG. 10A, a translinear circuit is formed by the closed loop of nMOS 410 to 413. The error amplifier correction current source 40 that comprises the translinear circuit is connected to the negative input side of the error amplifier 19, and therefore operates in such a manner that the correction current I flows in the direction of the negative input side of the Gm amplifier 405 when the voltage becomes higher than the reference voltage Voref. In this case, the correction current I takes on a gradually higher value (for example, FIG. 10B), by virtue of the translinear circuit, when the negative input side of the error amplifier 19 is higher than the reference voltage Voref.

FIG. 11 is a diagram illustrating another configuration example of the switching regulator 100. The switching regulator 100 comprises a switching circuit 42 and a first and a second resistor 29, 41 as an example of a correction unit 70 that corrects a negative input side voltage of the error amplifier 19 so as to be reduced to a certain value or lower.

The operation in this case is for example as follows. Specifically, for example, the switching circuit 42 turns a switch off upon input of "LOW" as the control signal (CNT). In this case, the combined resistance value at the interval Y is (r1+r2), wherein r1, r2 denote the resistances of the first and the second resistors 29, 41. The switching circuit 42, for example, turns a switch on upon input of "HIGH" as the control signal (CNT). In this case, the switch is on, and hence the combined resistance value at the interval Y is r1. The combined resistance value changes from (r1+r2) to r1 through turning of the switch from off to on by the switching circuit 42 (switching from "LOW" of the control signal (CNT) to "HIGH"). A characteristic of the above configuration is that the negative input side voltage of the error amplifier 19 is reduced to a certain value or lower, for a given period of time, through modification of the above combined resistance value (modification of the feedback resistance ratio). The switching circuit 42 and the first and second resistors 29, 41 illustrated in FIG. 11 are configured to cause the negative input side voltage of the error amplifier 19 to be reduced to a certain value or lower, through a change in the feedback resistance ratio, rather than to elicit the flow of the correction current I. The negative input side voltage of the error amplifier 19 is reduced to a certain value or lower through switching, by the switching circuit 42, in such a manner so as to modify the feedback resistance ratio of the first and second resistors 29, 41.

Other Examples

In the above-described examples, a configuration has been described in which the error amplifier 19 of the first comparator 17 is connected to the output of the error amplifier 19, and the negative input side is connected to the output of the I/V conversion circuit 16. The input of the first comparator 17 may be reversed, such that the output of the I/V conversion circuit 16 is connected to the positive input side and the output of the error amplifier 19 is connected to the negative input side. In this case, the output voltage of the first comparator 17 is reversed with respect to the "HIGH" and "LOW" in the above-described examples. Therefore, the logic unit 18 may switch on the first switching element 11 upon "LOW", and switch on the second switching element 12 upon "HIGH".

Input is likewise reversed in the second comparator 20. The positive input side may thus be connected to the output of the constant voltage source 26, and the negative input side connected to the output of the error amplifier 19. In this case as well, the output voltage in the second comparator 20 is outputted reversed with respect to the output in the above-described examples, such that during an automatic switching mode operation, the logic unit 18 performs a pause state upon input of "HIGH", and performs a PWM operation upon input of "LOW".

The present embodiments allow suppressing output voltage fluctuation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A switching regulator for converting an input voltage to a certain constant voltage and outputting the constant voltage, as an output voltage, to a load, the switching regulator comprising:

first switching element and second switching element; a logic unit which outputs to the load the output voltage converted from the input voltage to the constant voltage, by causing the first switching element and the second switching element to perform a switching operation;

an error amplifier which inputs the output voltage and first reference voltage, and outputs first signal indicating an error between the output voltage and the first reference voltage;

first comparator which inputs the first signal and second signal indicating an output voltage that is proportional to load current flowing in the load, and outputs to the logic unit control signal causing the logic unit to perform the switching operation based on the first signal and the second signal; and a correction unit which is connected to an input side of the error amplifier, and outputs a correction current causing the input voltage of the error amplifier to be reduced to a certain value or lower, wherein the correction unit includes a constant voltage source which supplies a reference voltage, and a Gm amplifier which is connected to the constant voltage source and converts a voltage to a current, and the Gm amplifier outputs the correction current according to a difference between the input voltage of the error amplifier and the reference voltage.

2. The switching regulator according to claim 1, further comprising a constant voltage source which is connected between the constant voltage source supplying the reference voltage and the Gm amplifier, and supplies an offset voltage, wherein the Gm amplifier outputs the correction current according to a difference between the input voltage of the error amplifier including the offset voltage and the reference voltage.

3. The switching regulator according to claim 1, further comprising a plurality of semiconductor elements which are connected between an input and an output of the Gm amplifier, wherein the plurality of semiconductors forms a closed loop, and is connected in such a manner that a product of current densities of each of the semiconductor elements in the clockwise direction and a product of current densities of each of the semiconductor elements in the counterclockwise direction are identical, when a number of the semiconductor elements in a clockwise direction and a number of the semiconductor elements in a counterclockwise direction in the closed loop are identical.

4. The switching regulator according to claim 1, wherein the correction unit includes a first resistor and a second resistor, and a switching circuit which modifies a feedback resistance ratio of the first resistor and the second resistor, and the switching circuit causes the input voltage of the error amplifier to be reduced to the certain value or lower by varying the feedback resistance ratio.

5. The switching regulator according to claim 1, further comprising an input terminal which inputs an external control signal instructing first mode to supply the output voltage at a constant cycle, or second mode to include a pause period in the first mode, wherein the correction unit causes the input voltage of the error amplifier to be reduced to the certain value or lower, when the switching regulator is at the pause period in the second mode and the external control signal instructing the first mode is inputted.

6. The switching regulator according to claim 5, wherein the correction unit discontinues the correction of the input voltage of the error amplifier when the switching regulator shifts from the pause period in the second mode to the first mode.

7. The switching regulator according to claim 6, further comprising a reverse current detection comparator which detects a reverse current flowing in the second switching element, wherein the logic unit turns off the second switching element, when signal detecting the reverse current is input from the reverse current detection comparator, until a certain period of time elapses since the pause period in the second mode shifts to the first mode.

8. The switching regulator according to claim 5, further comprising a mode control circuit which inputs the external control signal and a third signal and outputs a control signal controlling the operation of the correction unit, wherein, the mode control circuit outputs a control signal to control the correction unit so as to operate when the third signal indicated the pause period and the external control signal indicating the first mode is input, and outputs a control signal to control the correction unit so as to stop operation when the third signal indicating the first mode is input.

9. The switching regulator according to claim 1, wherein the error amplifier is an inverting amplifier circuit which inputs the output voltage and is connected to the correction unit in a negative input side of the inverting amplifier circuit, and inputs the first reference voltage in a positive input side.

10. The switching regulator according to claim 1, further comprising an I/V conversion circuit which outputs the second signal.

11. The switching regulator according to claim 1, further comprising a second comparator which inputs the first signal and second reference voltage, and outputs third signal indicating whether first mode or a pause period, in a second mode including the pause period in the first mode to supply the output voltage at a constant cycle based on the first signal and the second reference voltage, wherein the logic unit performs a switching operation to the first switching element and the second switching element when the third signal indicates the first mode, and discontinues the switching operation when the third signal indicates the pause period.

12. A switching regulator for converting an input voltage to a certain constant voltage and outputting the constant voltage, as an output voltage, to a load, the switching regulator comprising:
first switching element and second switching element; a logic unit which outputs to the load the output voltage converted from the input voltage to the constant voltage, by causing the first switching element and the second switching element to perform a switching operation;
an error amplifier which inputs the output voltage and first reference voltage, and outputs first signal indicating an error between the output voltage and the first reference voltage;
first comparator which inputs the first signal and second signal indicating an output voltage that is proportional to load current flowing in the load, and outputs to the logic unit control signal causing the logic unit to perform the switching operation based on the first signal and the second signal; and
a correction unit which is connected to an input side of the error amplifier, and outputs a correction current causing the input voltage of the error amplifier to be reduced to a certain value or lower, wherein the correction unit includes a constant current source, and a current mirror circuit which is connected to the constant current source and outputs a constant current, as the correction current, outputted from the constant current source.

* * * * *